United States Patent
Karner (10) Patent No.: US 6,303,165 B1
(45) Date of Patent: Oct. 16, 2001

(54) METHOD FOR AUTOMATICALLY SIZING AND POSITIONING FILLING MATERIAL UPON RANDOMLY SPACED TORTILLAS ADVANCING UPON CONVEYOR

(76) Inventor: James Edward Karner, 8929 Carlton Oaks Dr., Santee, CA (US) 92071

( * ) Notice: Subject to any disclaimer, the term of this patent is extended or adjusted under 35 U.S.C. 154(b) by 32 days.

(21) Appl. No.: 09/769,840

(22) Filed: Jan. 25, 2001

Related U.S. Application Data (62) Division of application No. 09/522,237, filed on Mar. 9, 2000.

(51) Int. Cl.[7] ................ A21D 6/00; A23L 1/00
(52) U.S. Cl. ............ 426/231; 426/138; 426/297; 426/502; 426/512
(58) Field of Search .................. 426/231, 138, 426/297, 496, 502, 512, 514; 99/353, 450.1, 450.2, 450.6, 450.7; 425/110, 112, 308

(56) References Cited

U.S. PATENT DOCUMENTS

| | | | |
|---|---|---|---|
| 3,757,676 | 9/1973 | Pomara | 99/450.6 |
| 3,858,497 | 1/1975 | Ishida | 99/450.6 |
| 3,901,137 | 8/1975 | Jimenez | 99/353 |
| 4,084,493 | 4/1978 | Quintana | 99/450.7 |
| 4,112,834 | 9/1978 | Thiry | 99/450.1 |
| 4,483,242 | 11/1984 | Goodman et al. | 99/450.6 |
| 4,516,487 | 5/1985 | Madison et al. | 99/450.6 |
| 4,608,919 | 9/1986 | Prows et al. | 99/450.6 |
| 4,691,627 | 9/1987 | Roberts | 99/450.6 |
| 4,719,117 | 1/1988 | Simelunas | 426/502 |
| 5,101,957 | 4/1992 | Schiek | 198/419.1 |
| 5,281,427 | * 1/1994 | Rahim | 426/297 |
| 5,328,709 | 7/1994 | Larsen | 426/502 |
| 5,330,776 | 7/1994 | Wikstroem | 426/500 |
| 5,456,298 | 10/1995 | Tennis | 141/156 |
| 5,509,350 | 4/1996 | Ashman et al. | 99/450.2 |
| 5,814,360 | * 9/1998 | McDilda et al. | 426/297 |
| 5,832,813 | 11/1998 | Shimazu | 99/450.2 |
| 5,912,035 | 6/1999 | Grat | 426/297 |

FOREIGN PATENT DOCUMENTS 2223391A   4/1990   (GB).

* cited by examiner

Primary Examiner—George C. Yeung

(57) ABSTRACT

A manufacturing apparatus produces defined lengths of meat or other filling materials for taquitos, enchiladas, burritos, and other rolled, wrapped, or folded tortilla foods. This apparatus includes a small, upper, filling conveyor that operates in parallel with a large, lower, tortilla conveyor. Other components include an extruder, nozzle, cutter, and various sensors that produce output signals indicating tortilla and filling position. Encoders are also provided to represent position and/or movement of at least the upper conveyor. According to the sensor outputs, a controller regulates operation of the upper conveyor, extruder, and cutter to produce and then accurately deposit segments of filling material upon tortillas as they pass by upon the lower conveyor. As needed, the controller (1) advances, reversed, and/or stops the upper conveyor, (2) directs the pump to start/stop filling production, and (3) regulates the cutter to cut extruded filling material.

6 Claims, 5 Drawing Sheets

METHOD FOR AUTOMATICALLY SIZING AND POSITIONING FILLING MATERIAL UPON RANDOMLY SPACED TORTILLAS ADVANCING UPON CONVEYOR

CROSS-REFERENCE TO RELATED APPLICATIONS

This application is a divisional of U.S. patent application Ser. No. 09/522,237, filed on Mar. 9, 2000 in the name of James E. Karner and entitled MACHINE FOR AUTOMATICALLY SIZING AND POSITIONING FILLING MATERIAL UPON RANDOMLY SPACED TORTILLAS ADVANCING UPON CONVEYOR.

BACKGROUND OF THE INVENTION

1. Field of the Invention

The subject invention relates to automated manufacturing equipment in the style of an assembly line. More particularly, the invention concerns a filling preparation station that produces defined lengths of meat or other filling materials and precisely places the filling material upon tortillas for the manufacture of taquitos, enchiladas, burritos, and other rolled, folded, or wrapped tortilla foods.

2. Description of the Related Art

For many years, the food manufacturing industry has been a productive source of technological innovation. Without the use of machines, the manufacturing of food products can require an enormous amount of repetitive labor. Although human workers are frequently needed to supervise, correct, and even perform many steps in the food manufacturing process, today's factories are using machines in greater numbers to complete tasks that are amenable to automated performance.

The Mexican food industry is no exception to the current trend. One example of automation in the Mexican food industry appears in the assembly of filled tortilla products such as "taquitos" (also known as "rolled tacos"), burritos, enchiladas, quesadillas, and the like. Each of these products comprises a tortilla that is wrapped, rolled, or folded about an internal "filling" material, such as meat, cheese, beans, and/or rice, etc. One early technical innovation in creating filled tortilla products has been the use of an extrusion machine to create filling segments of desired sizes. This extrusion machine places its filling segments upon a conveyor belt. Human hands remove filling segments from this conveyor belt, center the filling segments on tortillas arriving on a different conveyor belt, and roll, fold, or wrap the tortillas about their filling segments.

As an improvement to this product line, another known technique changed the process of creating and depositing the filing material. This technique employs a pulsed, volumetric extruder to create the filling segments. The extruder's nozzle is positioned to generate filling segments directly onto the tortillas arriving on their conveyor belt. After a filling portion is deposited on a tortilla, a human worker removes the filling and tortilla onto a platform, repositions the filling, rolls, folds, or wraps the tortilla about the filling segment, and places the completed product on an output conveyor belt leading to a fryer, freezer, or other processing device. This arrangement provided some benefit because it uses the extruder to initially place filling material onto tortillas, saving the cost of having human laborers perform this task.

Nonetheless, there are still a number of remaining challenges to those people interested in a more automated assembly line. One such challenge is in reducing variance in the sizes of the filling segments, since filling segments must include a minimum volume according to eventual package labeling. Therefore, in order to guarantee this minimum volume, the extruder must be adjusted to generate slightly larger filling pieces to account for the possibility of errant, small pieces. Whenever the size of a filing piece exceeds the designated minimum volume, however, the excess product incurs an excess cost. Accordingly, a significant challenge exists in the area of automatically controlling product size.

There are still other challenges in automated manufacturing of Mexican food. Even though the conventional approach initially places the filling material on the tortillas, workers are still needed to reposition the filling material because automated placement is not always accurate. Inaccurate placement is undesirable for various reasons, such as the creation of an unattractive and unappetizing product. In addition, if automated machinery places the filling material so poorly that it protrudes from the tortilla, the filling material could contaminate downstream processing equipment if this protruding filling material breaks off. Moreover, if poorly placed filling material misses its intended tortilla to create an unfilled tortilla, the tortilla can excessively absorb fryer oil, depleting the oil earlier than to otherwise necessary. As a result, human labor has been necessary to ensure accurate filling placement. This additional labor adds more cost to the assembly process, ultimately narrowing the profit margin for the ultimate product.

Consequently, known manufacturing processes for filled tortilla products are not completely adequate for some applications due to certain unsolved problems.

SUMMARY OF THE INVENTION

Broadly, this invention involves automated manufacturing equipment of the type utilized in an assembly line for food items. According to the invention, a filling preparation station produces defined lengths of meat or other filling materials for taquitos, enchiladas, burritos, and other rolled, folded, or wrapped tortilla foods. This station includes a smaller "upper" conveyor to carry filling segments, and a larger "lower" conveyor belt to carry tortillas. Other components include an extruder pump, cutter, and various sensors that produce output signals indicating tortilla and filling positions. According to the sensor outputs, a controller regulates operation of the filling conveyor, extruder pump, and cutter to produce and then accurately deposit segments of filling material upon tortillas as they pass by upon the lower conveyor belt. As needed, the controller (1) directs the filling conveyor to speed/slow/reverse, (2) directs the extruder pump to start/stop filling production, and (3) regulates the cutter to cut filling material as it emerges from the extruder pump.

More particularly, the controller performs dual roles, including (1) creating a filling segment of a desired size, and (2) accurately depositing the created filling segment upon a tortilla. To create the desired portion of filling segment, the controller awaits sensor outputs indicating arrival of a tortilla at a first designated site on the tortilla conveyor. Then, the controller starts the extruder pump after a prescribed time. Then, responsive to output signals indicating arrival of filling material at a first designated site on the filling conveyor, the controller completes a filling segment. Namely, the controller waits for a predetermined advancement of the upper conveyor belt (indicated by elapsed time or motor advancement) and then activates the cutter and stops the extruder pump.

To position the filling segment, the controller waits for arrival of a tortilla at a second designated site on the tortilla conveyor, and then starts a counter. Then, responsive to sensor outputs indicating arrival of the filling segment at a second designated site on the filling conveyor, the controller computes an offset between the filling segment and the tortilla. Using this offset, the controller then calculates a position correction profile to place the filling segment in predetermined relationship to the tortilla, and finally directs the motor to move the filling conveyor according to the position correction profile.

The foregoing features may be implemented in a number of different forms. For example, the invention may be implemented to provide a method to prepare food items utilizing a procedure such as that described above. In another embodiment, the invention may be implemented to provide an apparatus in the form of a filling preparation station of an assembly line. In still another embodiment, the invention may be implemented to provide a signal-bearing medium tangibly embodying a program of machine-readable instructions executable by a digital data processing apparatus to operate as discussed above. Another embodiment concerns logic circuitry having multiple interconnected electrically conductive elements configured to operate as mentioned above.

The invention affords its users with a number of distinct advantages. For example, the invention saves product costs and conserves resources because it generates filling segments of accurate size. Assembly lines no longer need to oversize products to guarantee a minimum size. In addition, the invention creates a more attractive product, preserves fryer oil, and saves labor costs by using automated means to deposit filling segments on corresponding tortillas. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

HARDWARE COMPONENTS & INTERCONNECTIONS

Introduction

One aspect of the invention concerns an apparatus for automatically sizing and positioning filling material upon randomly spaced tortillas advancing upon a conveyor belt.

Figure 1:
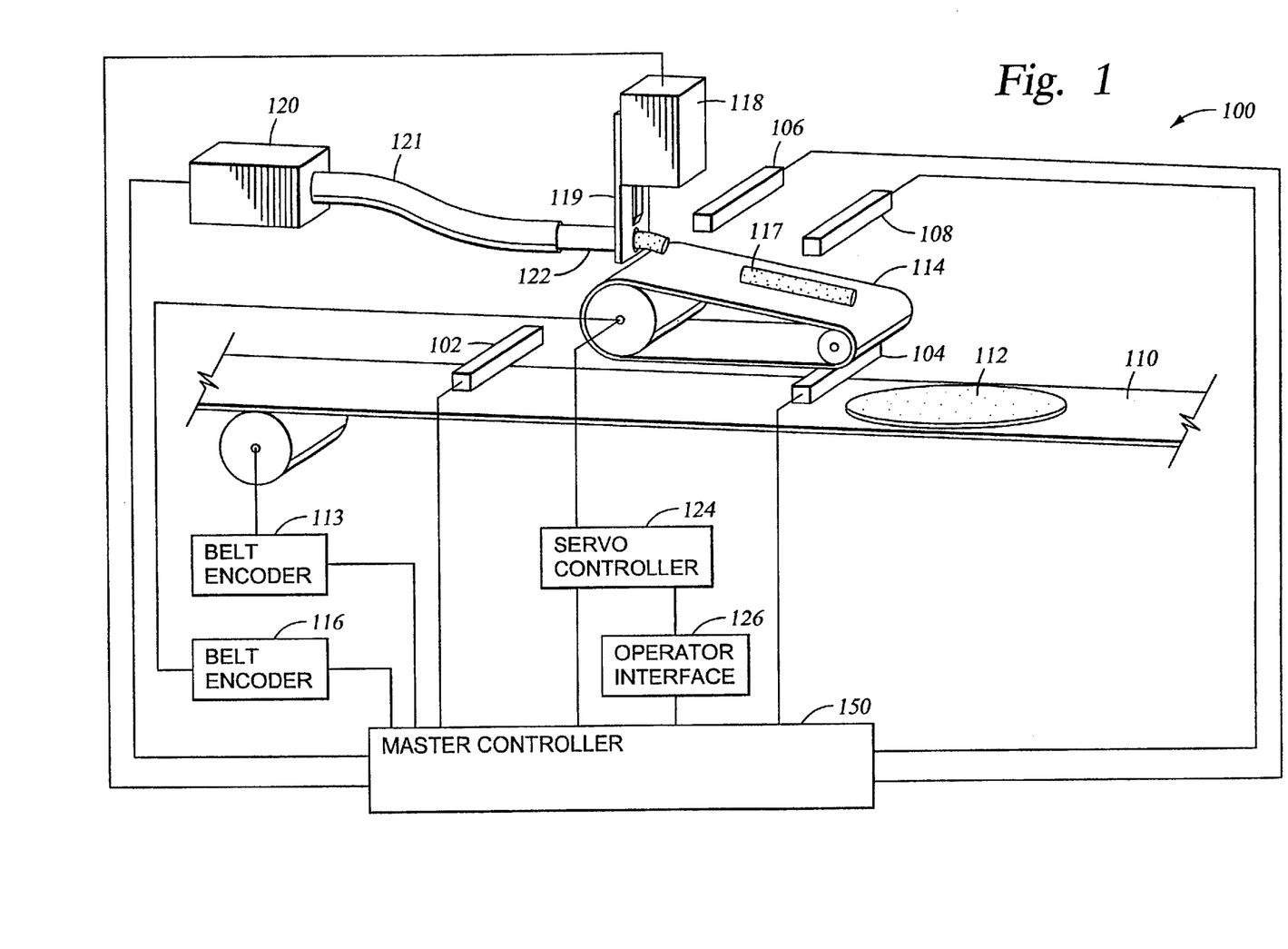
FIG. 1 is a block diagram of the hardware components and interconnections of an apparatus to automatically size and position filling material upon randomly spaced tortillas advancing upon a conveyor belt, according to the invention.

This invention may be embodied by various hardware components and interconnections, with one example being described by the apparatus 100 in FIG. 1.

The apparatus 100 includes a filling conveyor 114, a tortilla conveyor 110, various sensors, a portioning assembly, control circuitry for operating the portioning assembly and filling conveyor according to sensor input, and certain miscellaneous hardware. Generally, the sensors comprise suitable hardware to detect presence of filling material and tortillas at various stages of progression along the conveyors 114, 110, and other hardware to detect position and/or movement of the conveyors. The portioning hardware includes an extruder pump 120, hose 121, cutter 118, bushing 119, and nozzle 122 for generating segments of filling material.

Conveyors

The tortilla conveyor 110 comprises a mechanism that supports tortillas, such as the tortilla 112, as the tortillas advance along a forward path 111. In the illustrated embodiment, the conveyor 110 comprises a continuous belt that carries tortillas after they emerge from a tortilla oven. However, the tortillas may arrive from another source, such as a stacker for premanufactured tortillas, etc. The belt of the tortilla conveyor 110 may comprise solid, flexible strips of material, or a lattice with suitably defined apertures to encourage the tortillas to cool, for example. Although the nature of tortilla ovens results in tortillas arriving on the conveyor 110 at random times, the apparatus 100 includes advantageously ensures that one filling segment is accurately deposited upon each arriving tortilla. The tortilla conveyor 110 progresses at a known rate, such as 150 ft/min.

The filling conveyor 114 comprises a mechanism that supports and positions filling segments (such as 117), and ultimately deposits each filling segment on an arriving tortilla. The filling conveyor 114 is positioned above the tortilla conveyor 110, enabling filling segments to drop onto tortillas proceeding along the tortilla conveyor 110. As an example, the conveyor 114 may be positioned about one inch above the conveyor 110. The conveyor 114 includes a belt, which may comprise a flexible material such as urethane material over polyester as one example. This belt is driven by a belt motor 115, such as an electrically operated, low inertia servo motor, or another motor with suitable accuracy, speed, and other properties to satisfy the operational requirements discussed below. One example is the Allen Bradley W3016 servo motor.

The end-to-end length of the filling conveyor 114 is established as the length of one filling segment plus a prescribed "correction distance." As discussed in greater detail below, the correction distance is a minimum length required by the filling conveyor 114 to accelerate a filing piece to the precise location needed to accurately meet an arriving tortilla. The correction distance depends upon a number of factors, such as those described as follows. Deceleration requires no correction distance since the belt may be simply stopped with one filling piece on it. The correction distance depends upon the accuracy with which the extruder pump 120 and nozzle 122 initially deposit filling segments on the filling conveyor. For example, if a filling segment is deposited in perfect alignment with its arriving tortilla, the correction distance is not needed at all.

The length of the filling conveyor belt is determined so that, considering the desired "target" length of a filling segment, there will only be one filling segment on the belt at one time during the correction process, i.e., the filling segment being deposited on a tortilla. In limited circumstances, however, a slightly "overlapping" filling segment may contact the filling conveyor belt while another segment is being corrected. Namely, one segment may undergo correction during the brief period that another "overlapping" filling segment is being created by the extruder or deposited onto the tortilla conveyor 110. Namely, the change in velocity of the filling conveyor 114 will not affect the overlapping filling segment because the overlapping filling segment is more profoundly influenced by the extruder pump 120 (for filling segments being generated) or the tortilla conveyor 110 (for filling segments being deposited onto the tortillas).

As an alternative, integer multiples of the foregoing belt length may also be used if desired. Ultimately, the filling conveyor belt length and correction distance may be determined empirically (i.e., by experience), with an exemplary correction distance being about one inch in some cases.

The filling conveyor is driven by a conveyor motor 115. As an example, the conveyor motor 115 may comprise an electric servo motor. If desired, the motor 115 may incorporate a built-in encoder 116, eliminating the need for the separately illustrated encoder 116.

Sensors

The sensors include a number of sensing devices to determine position of tortillas and filling material along their respective conveyors and to determine position and/or velocity of the conveyors 114, 110. According to one implementation, the sensors may include (1) tortilla sensors 102, 104, (2) filling sensors 106, 108, and (3) belt encoders 113, 116. As an example, the tortilla and filling sensors may comprise optical sensors, such as light transmitter/receiver pairs or other optically actuated devices. Some exemplary transmitters include light emitting diodes ("LEDs"), lasers, incandescent lights, semiconductor lasers, etc. Some exemplary receivers include photosensors such as phototransistors and photodiodes. The sensors are placed at various sites along the conveyors 110, 114. Each transmitter/receiver pair creates a beam that is broken or otherwise altered when a tortilla or filling segment arrives at the sensor's location. To encourage sanitation and prevent contamination, the sensor bodies may be remotely located from the conveyors, where suitable light transmissive materials such as fiber optics are used to convey data between the remotely located sensor bodies and the appropriate sites on the conveyors.

In the illustrated example, tortilla sensors 102, 104 are placed at various locations along the tortilla conveyor 110. Each tortilla sensor 102, 104 is configured to direct a beam onto or through the conveyor 110, which signals arrival of a tortilla when the normal beam is altered or broken for a substantial period of time. The upstream tortilla sensor 102 is placed beneath the end of the nozzle 122, or at any other point upstream of this place along the tortilla conveyor 110 (as illustrated). The downstream tortilla sensor 104 is placed substantially beneath the location of the downstream filling sensor 108 (discussed below), which in one implementation results in placement of the downstream tortilla sensor 104 about one inch upstream from the downstream end of the filling conveyor 114. If desired, the second tortilla sensor 104 may be omitted from the system 100 by using position encoding information from the tortilla conveyor 110 to approximate tortilla position.

The filling sensors 106, 108 are placed at various locations along the filling conveyor 114. In the illustrated example, the filling sensors 106, 108 are configured to direct a beam across the conveyor 114, which signals arrival of a filling segment when the beam is broken or otherwise altered. In the illustrated example, the upstream filling sensor 106 is placed along the conveyor 114 at a point just past where filling initially contacts the conveyor 114. This placement of the sensor 106 gives the filling material time to arrive upon the conveyor 114 and assume the conveyor's velocity after being momentarily airborne from the nozzle 122. The downstream filling sensor 108 is placed along the conveyor 114, spaced from the filling conveyor's downstream end by a prescribed "correction distance." This correction distance is the same distance as discussed previously in the context of the length of the filling conveyor 114.

Another sensor is the belt encoder 113, which comprises a mechanism that senses position and/or speed of the tortilla conveyor 110 and provides a representative output. As an example, the encoder 113 may comprise an optical phototransistor, or another suitable mechanism. The encoder 113 may, for example, provide an output pulse each time the conveyor 110 advances by a certain distance. The belt encoder 113 is coupled to the conveyor 110 through a motor, a belt wheel, pulley, or another component whose position or motion is indicative of the speed and/or position of the conveyor 110. As a specific example, the encoder may provide 1,024 output pulses for each three-hundred-sixty degree rotation of the belt wheel, motor, etc. The system also includes an encoder 116 for the conveyor 114, which as an example, may be integrated with the motor 115. The encoder 116 may utilize similar components and operational principles as the encoder 113, for example.

Portioning Assembly

The portioning assembly includes mechanisms to create segments of filling material having a desired "target" size. In the illustrated embodiment, the portioning assembly includes an extruder pump 120, hose 121, cutter 118, nozzle 122, and bushing 119. The extruder pump 120 comprises a mechanism for extruding a material such as cooked beef or chicken meat processed into a uniform consistency for machine handling. As one example, the extruder pump 120 may be a machine that extrudes filling material at a selected volumetric rate. Preferably, this rate is selected to match the rate of advancement of the tortilla conveyor 110, which is 150 ft/min in the example discussed above. Matching these rates helps maximize throughput of the system 100, enabling the filling conveyor 114 to normally proceed at this speed except for periods of correction.

In one exemplary implementation, the extruder pump 120 includes a hopper to contain filling material that is drawn into a compression and portioning chamber by vacuum suction. Spinning vanes separate the filling into measured portions while the vacuum compresses and pressurizes the filling for extrusion. Pressurized, measured portions exit the pump through the hose 121 (also called a "horn") and move into a tapered extrusion nozzle 122. The nozzle 122 is dimensioned to create filling segments of a desired cross-sectional size and shape, e.g., circular, star-shaped, oval, rectangular, etc. As one example; the extruder pump may be embodied by a Handtmann brand VF200 product.

The cutter 118 comprises a mechanism for cutting filling material as it streams out of the nozzle 122. In one embodiment, the cutter 118 comprises a blade that operates by reciprocating against the bushing 119, as shown. As one example, the cutter 118 may comprise a pneumatically actuated element, operated by a solenoid. The cutter 118 and bushing 119 abut each other on respective flat surfaces, and therefore cooperatively cut in the fashion of a guillotine.

Control Circuitry

Broadly, the control circuitry directs the portioning assembly and filling conveyor 114 in order to manage the operation of the apparatus 100, where this activity is regulated according to feedback that the control circuitry receives from the sensors. In the illustrated embodiment, the control circuitry includes a master controller 150 and a servo controller 124. The master controller 150 receives output signals from the sensors 102, 104, 106, 108 and also from the belt encoders 113, 116. The master controller 150 uses these signals to drive the cutter 118 to create filling segments of a prescribed target size. In addition, the master controller 150 uses the sensors' signals to drive the motor 115 (via the servo controller 124) as needed to place each filling piece precisely on a respective tortilla. Depending upon the particular application, the master controller 150 may be embodied by various electronic devices such as one or more microprocessors, logic circuits, personal computers, computer workstations, assemblies of discrete circuit elements, etc. One example is an Intel Pentium 150 microprocessor or an Allen Bradley SLC 504 (PLC) product. The servo controller 124 operates, under direction of the master controller 150, to issue specific control signals compatible with the motor 115. As an example, the servo controller 124 may comprise an Allen Bradley Ultra 1496 product. In an different implementation, the controllers 150, 124 may be combined.

In addition to the controllers 150, 124, the control circuitry includes an operator interface 126. The interface 126 comprises a device for the controllers 150, 124 to exchange data with a human operator. The operator may utilize the interface 126 to obtain operational data from the controllers 150, 124, issue commands to the controllers, etc. For example, the interface 126 may be used to set operating parameters (such as the delay of step 406 described below), start the extruder pump 120, start certain processes (such as 400–500 described below), establish the target length of the filling segments, etc. The interface 126 includes an LCD screen, CRT screen, computer monitor, or another suitable visual display. In addition, the interface 126 includes an input device to receive information from the human operator. Some examples of the input device include a keypad, keyboard, touch pad, touch screen, joystick, computer mouse, etc.

Exemplary Digital Data Processing Apparatus

Another aspect of the invention concerns a digital data processing apparatus, which may be used to implement the controller 150. This apparatus may be embodied by various hardware components and interconnections; one example is the digital data processing apparatus 200 of FIG. 2. The apparatus 200 includes a processor 202, such as a microprocessor or other processing machine, coupled to a storage 204. In the present example; the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, one or more magnetic data storage disks such as a "hard drive," a tape drive, or any other suitable storage device. The apparatus 200 also includes an input/output 210, such as a line, bus, cable, electromagnetic link, or other means for the processor 202 to exchange data with other hardware external to the apparatus 200.

Figure 2:
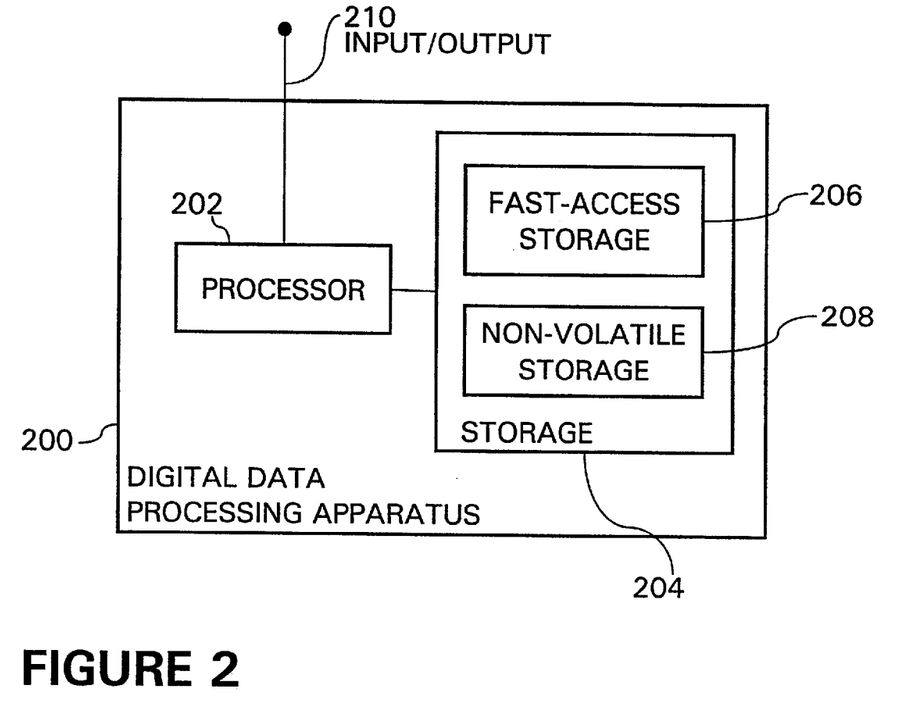
FIG. 2 is a block diagram of a digital data processing machine according to the invention.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Logic Circuitry

In contrast to the digital data storage apparatus discussed previously, a different embodiment of the invention uses logic circuitry instead of computer-executed instructions. Depending upon the particular requirements of the application in the areas of speed, expense, tooling costs, and the like, this logic may be implemented by constructing an application-specific integrated circuit ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

OPERATION

In addition to the various hardware embodiments described above, a different aspect of the invention concerns a method for automatically sizing and positioning filling material upon randomly spaced tortillas advancing upon a conveyor belt.

Signal-Bearing Media

In the context of FIGS. 1–2, such a method may be implemented, for example, by operating the controller 150, as embodied by a digital data processing apparatus 200, to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to automatically size and position filling material upon randomly spaced tortillas advancing upon a conveyor belt.

Figure 3:
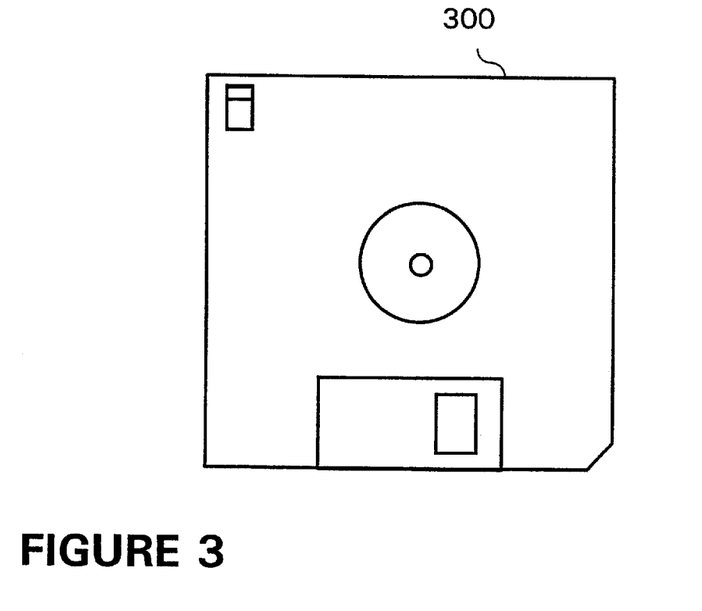
FIG. 3 shows an exemplary signal-bearing medium according to the invention.

This signal bearing media may comprise, for example, RAM (not shown) contained within the controller 150, as represented by the fast-access storage 206. Alternatively, the instructions may be contained in another signal-bearing media, such as a magnetic data storage diskette 300 (FIG. 3), directly or indirectly accessible by the processor 202. Whether contained in the storage 206, diskette 300, or elsewhere, the instructions may be stored on a variety of machine-readable data storage media, such as direct access storage (e.g., a conventional "hard drive," redundant array of inexpensive disks ("RAID"), or another direct access storage device ("DASD")), magnetic tape, electronic read-only memory (e.g., ROM, EPROM, or EEPROM), optical storage (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as General Machine Language ("GML") of Allen Bradley Corporation, etc.

Logic Circuitry

In contrast to the signal-bearing medium discussed above, the method aspect of the invention may be implemented using logic circuitry, without using a processor to execute instructions. In this embodiment, the logic circuitry is implemented in the master controller 150, and is configured to perform operations to implement the method of the invention. The logic circuitry may be implemented using many different types of circuitry, as discussed above.

Portion Control

Figure 4:
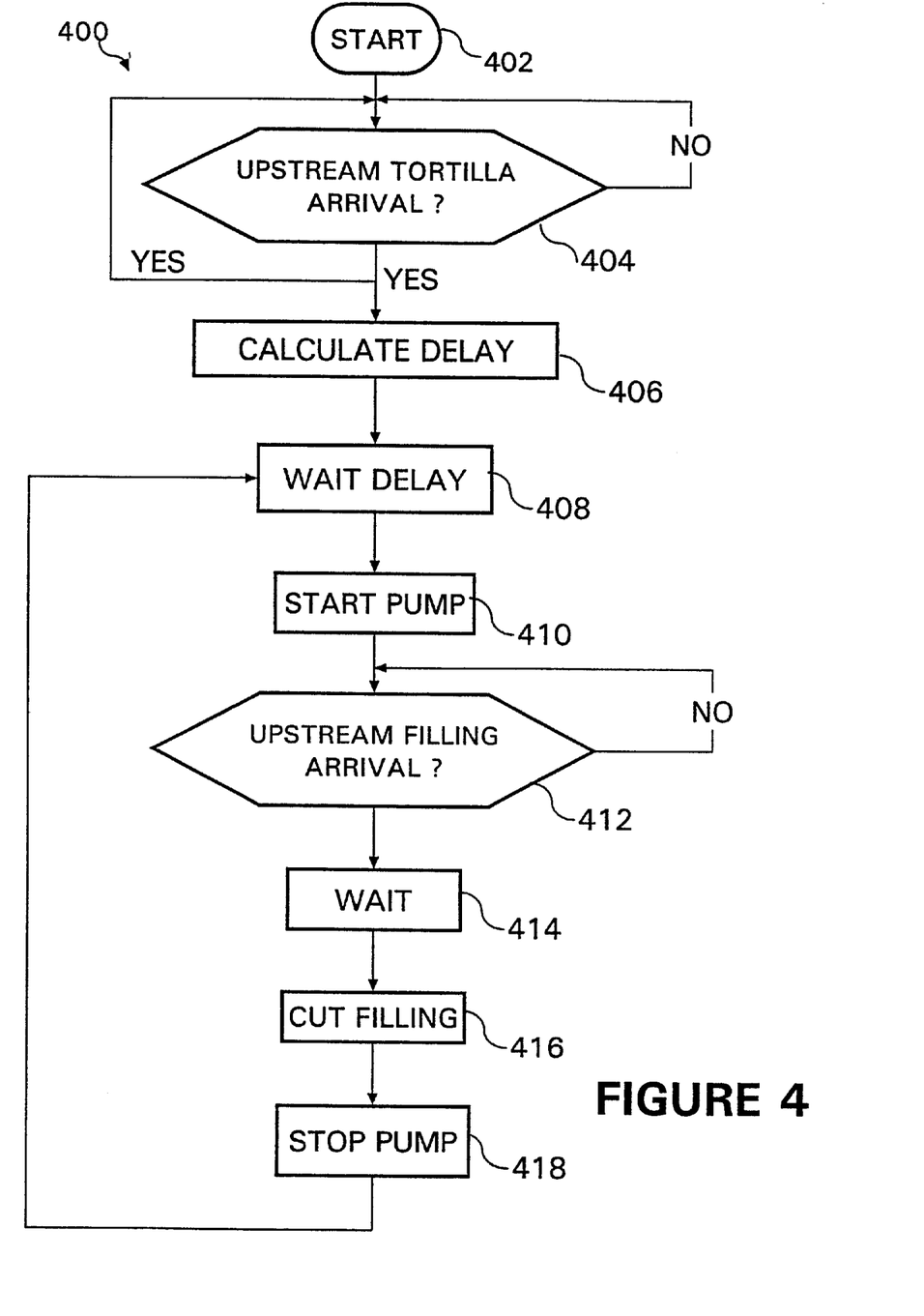
FIG. 4 is a flowchart of an operational sequence for generating a desired size of filling segment, according to the invention.

FIG. 4 shows a sequence to create filling segments of a desired "target" length, to illustrate one example of the method aspect of the present invention. The present invention's approach, explained below, contrasts with that of conventional applications. Namely, conventional applications create filling segments by pulsing a volumetric extruder machine at periodic intervals. However, as discovered by the present inventor(s), there are many different unpredictable influences on this process making it nearly impossible to precisely control filling length by timing. Some of these factors include the fluid flow dynamics in the extruder, constriction of the nozzle, compression occurring in the extruder nozzle, the cold temperature of semi-frozen products, the warming of filling material proportional to the time of residence in the extruder, the ingredients of the particular filling material being processed, etc. Another factor is the speed differential between some extruders (on the order of 450 ft/min) and some tortilla conveyor belts (on the order of 150 ft/min).

The present invention's portioning sequence is shown by the steps 400 of FIG. 4. For ease of explanation, but without any intended limitation, the example of FIG. 4 is described in the context of the apparatus 100 described above. During the sequence 400, the master controller 150 causes the filling conveyor 114 to advance at its normal rate (150 ft/min in this example), except for a brief period of correction whose timing and length is determined by a different process (namely, step 518 of the positioning sequence 500, described below). Thus, the speed of the filling conveyor 114 (150 ft/min in this example) matches the extrusion speed (also 150 ft/min) when a filling segment is being deposited onto the filling conveyor, and also matches the tortilla conveyor speed (also 150 ft/min) when a filling segment is being deposited thereon.

After the steps 400 are initiated in step 402, the controller 150 continually determines whether the upstream tortilla sensor 102 has detected an advancing tortilla (step 404). Each time a tortilla is detected, the master controller 150 computes a delay (step 406) and waits for this period to expire (step 408) before starting the extruder pump 120 (step 410). This delay is intended to account for the horizontal offset between the tip of the nozzle 122 and the placement of the sensor 102. Thus, the extruder pump 120 starts to create a new filling segment as its corresponding tortilla is passing by underneath the filling conveyor 114. If desired, the sensor 102 may be repositioned upstream by any distance as long as the delay (step 406) is increased proportionally. As one example, steps 406–408 may be implemented by waiting for the encoder 116 to emit a predetermined number of distance-indicative pulses, rather than using any actual time reference.

When the upstream filling sensor 106 senses arrival of the filling material on the filling conveyor 114 (step 412), the routine 400 proceeds to step 414. In step 414, the master controller 150 waits for the filling conveyor 114 to advance by a distance shown in Equation 1.

$$\text{distance of advancement} = \text{one target filling length} - \text{distance between sensor 106 and cutter 118} \quad [1]$$

In other words, the master controller 150 waits for the tortilla conveyor 114 to advance enough so that a single filling length extends past the cutter 118. Step 414 may be performed in various ways. For greatest accuracy, the master controller 150 initially determines the filling conveyor's position using the encoder 116, and then waits until the encoder shows that the conveyor 114 has advanced by the amount of Equation 1. As an alternative, the master controller 150 may initially use a clock to mark the time that the sensor 106 senses filling, and then wait an appropriate period of time (based upon the conveyor's velocity determined by input to the motor 115 or output of the encoder 116) for the conveyor to advance by the amount of Equation 1. As still another alternative, step 414 may be omitted if the upstream filling sensor 106 is located to inherently detect one exact target length of filling, for example if the sensor 106 is located one filling length away from the cutter 118.

When the filling has advanced sufficiently (step 414), the master controller 150 initiates the cutter blade by sending an appropriate signal to the cutter 118, thereby precisely cutting a filing portion of the target length (step 416). After step 416, the master controller 150 stops the extruder pump 120 (step 418), since the desired filling segment has been created. Step 418 is preferably performed immediately after step 416, or concurrently therewith, in order to prevent possible damage to the cutter by extruding filling material when the cutting blade is closed. Thus, after step 416 starts the cutter blade in motion (or soon after), step 418 turns off the extruder pump 120. The timing of step 418 may even account for any delay in filling an air cylinder if the cutter is pneumatically operated. Step 418 then returns to step 408 to await another tortilla, as discussed above.

Position Control

Figure 5:
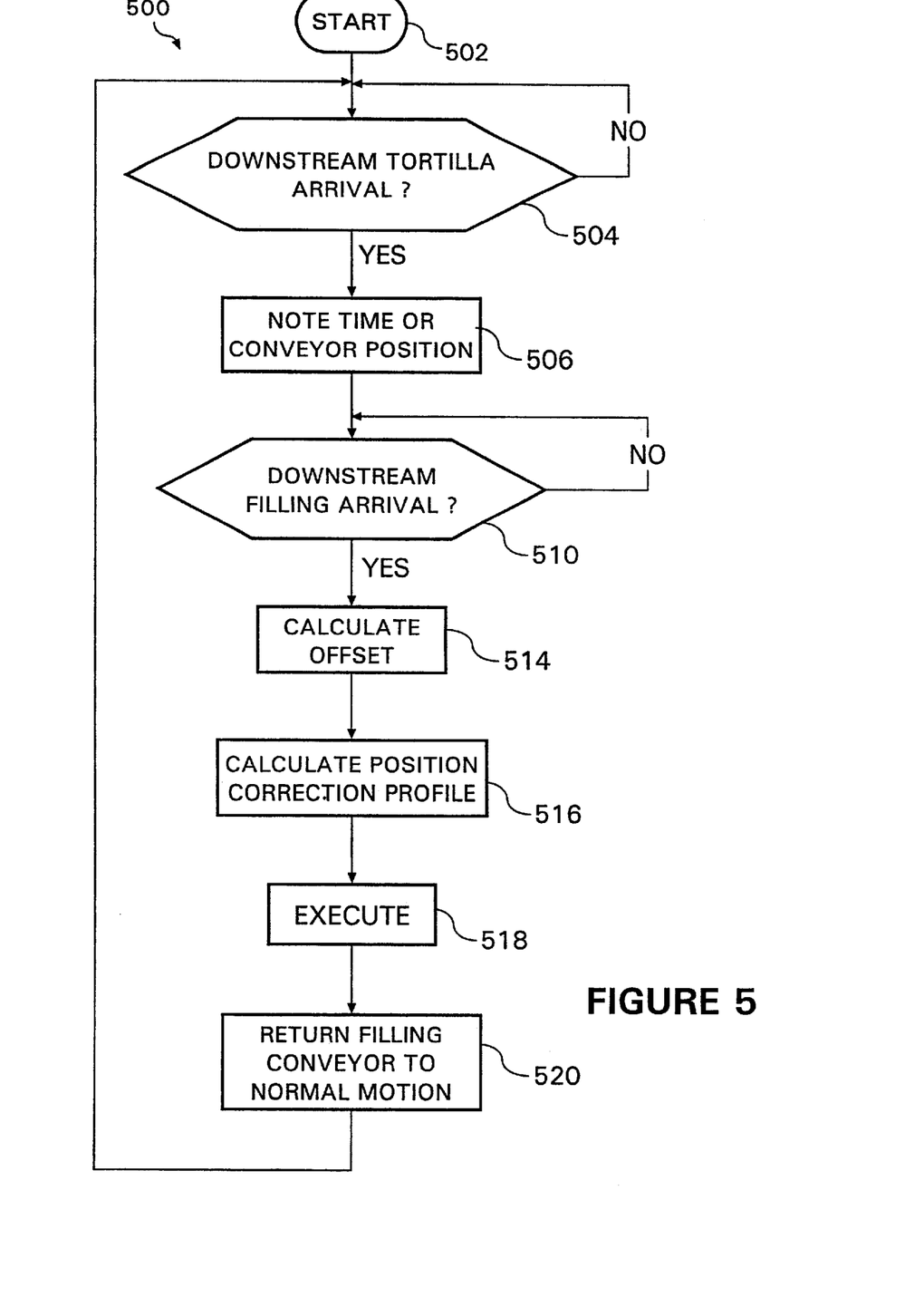
FIG. 5 is a flowchart of an operational sequence for accurately placing filling segments on arriving tortillas, according to the invention.

FIG. 5 shows a sequence 500 to accurately deposit filling segments upon advancing tortillas, to illustrate another method aspect of the present invention. For ease of explanation, but without any intended limitation, the example of FIG. 5 is described in the context of the apparatus 100 described above. When the steps are initiated in step 502, the controller 150 then determines whether the downstream tortilla sensor 104 has detected an advancing tortilla (step 504). When a tortilla is detected, the master controller 150 uses the belt encoder 113 to mark the tortilla conveyor's position, and also uses the belt encoder 116 to mark the filling conveyor's position (step 506). Alternatively, if the encoders are pulse-type encoders, the master controller 150 begins counting these output pulses in order to monitor advancing position of the conveyors.

Next, the master controller 150 determines whether the downstream filling sensor 108 has sensed arrival of a filling segment (step 510). When this occurs, the master controller 150 reads the belt encoder 113 to determine the position of the tortilla conveyor 110 (step 514). The amount of the advancement of the tortilla past the sensor 104 is calculated by subtracting the tortilla conveyor's position from step 504 from its position now in step 510. Then, with the tortilla's calculated position and the filling segment's known position (at the sensor 108 as of step 510), the master controller 150 computes a "position correction profile" (step 516) defining the speeds needed for the filling conveyor to place the filling segment in a predetermined relationship to the arriving tortilla.

As an alterative, steps 504, 506 may be omitted (along with the downstream tortilla sensor 104) by substituting a different step. Namely, this substituted step begins tracking positions of the tortilla conveyor 110 after upstream tortilla arrival (i.e., step 404, FIG. 4). This makes it possible to later calculate tortilla offset (step 514) using the tortilla's upstream position (instead of downstream) as a baseline.

After step 516, the master controller 150 directs the servo controller 120 to execute the position correction profile, and thereby engage in a brief period of "correction." Namely, servo controller, 124 and motor drive 115 are operated to give the appropriate speed and position of the filling conveyor to execute the computed position correction profile. The computed correction profile may include rapid advancement, reversing, and/or stopping of the filling conveyor's motion. When the filling conveyor 114 is driven according to the computed profile, it precisely aligns the filling segment (detected in step 510) with the tortilla. After step 518, the master controller 150 in step 520 directs the servo controller 120 to return the motor 115 to its normal rate of motion, which is 150 ft/min in the present example. This is the proper speed at which to deposit the filling material onto the tortilla, since it matches the speed of the tortilla conveyor 110 as discussed above.

Position Correction Profile- More Detail

The computation of the position correction profile (step 516) is now discussed in greater detail. In one embodiment, the position correction profile may be determined by detailed planning of the filling conveyor's velocity between the times of performing steps 518, 520. For ease of discussion, these velocities may be graphically explained by a velocity curve 600 (FIG. 6), although the master controller 150 need not actually develop any graphics. For this discussion, the velocity curve 600 is presented in relation to a horizontal axis 612 representing time, and a vertical axis 614 representing velocity of the filling conveyor 114. Thus, the velocity curve 600 shows the filling belt's velocity from a first time 620 to a second time 622. The first time corresponds to step 518, and the second time corresponds to step 520.

Figure 6:
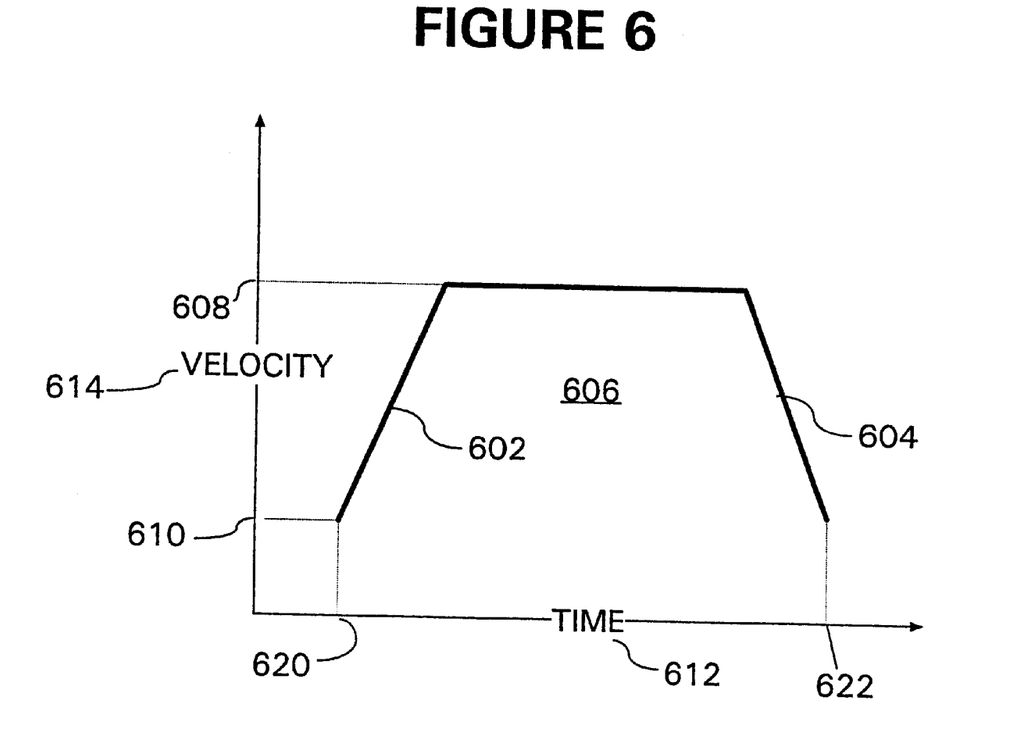
FIG. 6 is a graph showing an illustrative velocity curve, according to the invention.

The master controller 150 considers a number of different factors in computing an underlying position correction profile, which yields the velocity curve 600. Chiefly, the master controller 150 determines which combination of advancement, reversal, and stopping of the filling conveyor 114 will bring the conveyor's current filling segment into alignment with the arriving tortilla. Relatedly, the area 606 beneath the velocity curve 600 represents the distance traveled by the filling conveyor 114 between the times 620, 622, which must equal the difference between the tortilla's position (determined in step 514) and the filling position (at the sensor 108, per step 510). The master controller 150 computes the filling conveyor's correction profile so that the current filling segment is aligned with the tortilla at the time 622.

The initial and final speed 610 of the motor corresponds to the tortilla conveyors speed, and is therefore said to be one-to-one or "1:1." In computing the correction profile, however, the master controller 150 considers various parameters of the hardware system. For example, the maximum positive slope of the incline 602 and maximum negative slope of the decline 604 are limited by how fast the motor 115 can be accelerated and decelerated. Also, the maximum velocity 608 is limited by the top speed of the motor 115.

Although the illustrated curve 600 is an acceleration curve, where all velocities are greater than the one-to-one speed 610, the curve 600 may include times where the filling conveyor's velocity is zero or even goes backwards. In this respect, moving the filling conveyor backwards may be more desirable than stopping because it permits some position correction to occur while a new filling segment is arriving, thereby delaying the deposit of the corrected filling segment as long as possible. To avoid placement errors, reversal of the filling conveyor may be subject to several limitations. For instance, reversal of a filling segment past the cutter 118 is undesirable because of the likelihood of interfering with the creation of new filling segments. Also, reversal of a filling segment to a point prior to the sensors 108, 106 may be undesirable because of the added software complexity needed to account for the possibility of filling segments advancing past the sensors 108, 106 multiple times. In addition, the time of reversal of the filling conveyor should be limited to permit re-acceleration to the normal forward speed (150 ft/min as illustrated) prior to arrival of each new filling segment from the extruder. In one exemplary application, the foregoing factors may be implemented by limiting maximum reverse travel to an empirically determined length, such as one inch. The design of the correction profile may also consider a variety of other factors, such as the desire to avoid disrupting filling material by drastic adjustments in conveyor movement, avoiding wear and tear on the machinery, etc.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. For instance, the invention may be applied in the context of manufacturing wraps, pastries, ethnic foods, and a variety of other foods whether tortilla-based or not. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A method for producing and then accurately depositing segments of filling material upon tortillas in a system that includes:

a lower conveyor;

an upper conveyor and selectable-speed drive motor;

a portioning assembly including a pump, an extruder nozzle, and machine-activated blade;

object sensors including one or more tortilla sensors and one or more filling sensors;

a controller coupled to the motor, pump, sensors, and blade;

where the method is performed by the controller and comprises operations of:

performing operations to create a filling segment of a desired size, comprising:

responsive to signals from the tortilla sensor indicating arrival of a tortilla at a first designated site on the lower conveyor, starting the pump at a prescribed time thereafter;

responsive to signals from the filling sensor indicating arrival of filling material from the extruder nozzle at a first designated site on the upper conveyor, waiting for a predetermined advancement of the upper conveyor and then activating the blade and stopping the pump to complete a filling segment;

performing operations to accurately deposit the completed filling segment upon the arriving tortilla, comprising:

responsive to signals from the tortilla sensor indicating arrival of a tortilla at a second designated site on the lower conveyor, starting to monitor position of the lower conveyor;

responsive to signals from the filling sensor indicating arrival of the filling segment at a second designated site on the upper conveyor, utilizing the tortilla's monitored position to determine offset between the filling segment and the tortilla;

calculating a correction profile of upper conveyor movement to place the filling segment in predetermined relationship to the tortilla; and directing the motor to execute the correction profile and deposit the filling segment upon the tortilla.

2. The method of claim 1, the operation of monitoring position of the lower conveyor comprising at least one of the following:

measuring elapsed time since arrival of the tortilla at the second designated site;

counting encoder pulses indicative of drive motor advancement since arrival of the tortilla at the second designated site.

3. The method of claim 1, the motor executing the correction profile while only one filling segment resides upon the upper conveyor.

4. The method of claim 1, the operation of depositing the filling segment comprising:

adjusting motor speed to deposit the filling segment at a speed substantially matching a speed of the tortilla upon the lower conveyor.

5. The method of claim 1, the operations further including:

during arrival of filling material from the extruder nozzle adjusting motor speed to substantially match speed of the arriving filling material.

6. The method of claim 1, the operations of directing the motor to execute the motion profile comprising changing at least one of the following: motor speed, motor direction.

* * * * *

UNITED STATES PATENT AND TRADEMARK OFFICE
CERTIFICATE OF CORRECTION

PATENT NO.   : 6,303,165 B1
DATED        : October 16, 2001
INVENTOR(S)  : James Edward Karner

It is certified that error appears in the above-identified patent and that said Letters Patent is hereby corrected as shown below:

<u>Title page,</u>
Below Item [76], Inventors, insert the following: -- [73] Assignee: ORA Corporation, San Diego, CA (US) --.

Signed and Sealed this

Eighteenth Day of June, 2002

Attest:

Attesting Officer

JAMES E. ROGAN
*Director of the United States Patent and Trademark Office*